Oct. 27, 1942.   E. F. LOWEKE   2,299,912
COMPOUND MASTER CYLINDER
Filed Feb. 7, 1940   2 Sheets-Sheet 1
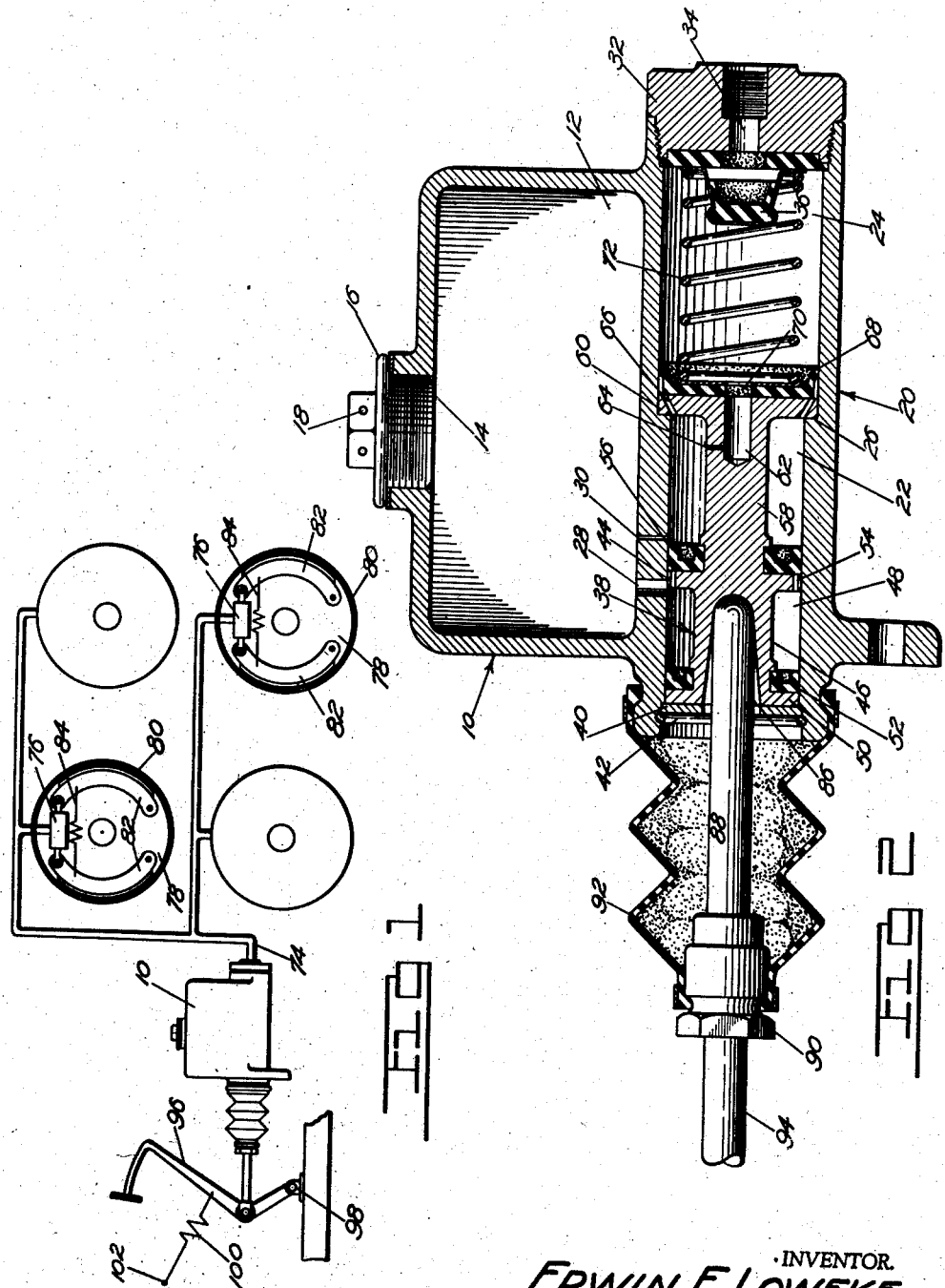
INVENTOR.
ERWIN F. LOWEKE
BY
ATTORNEY.

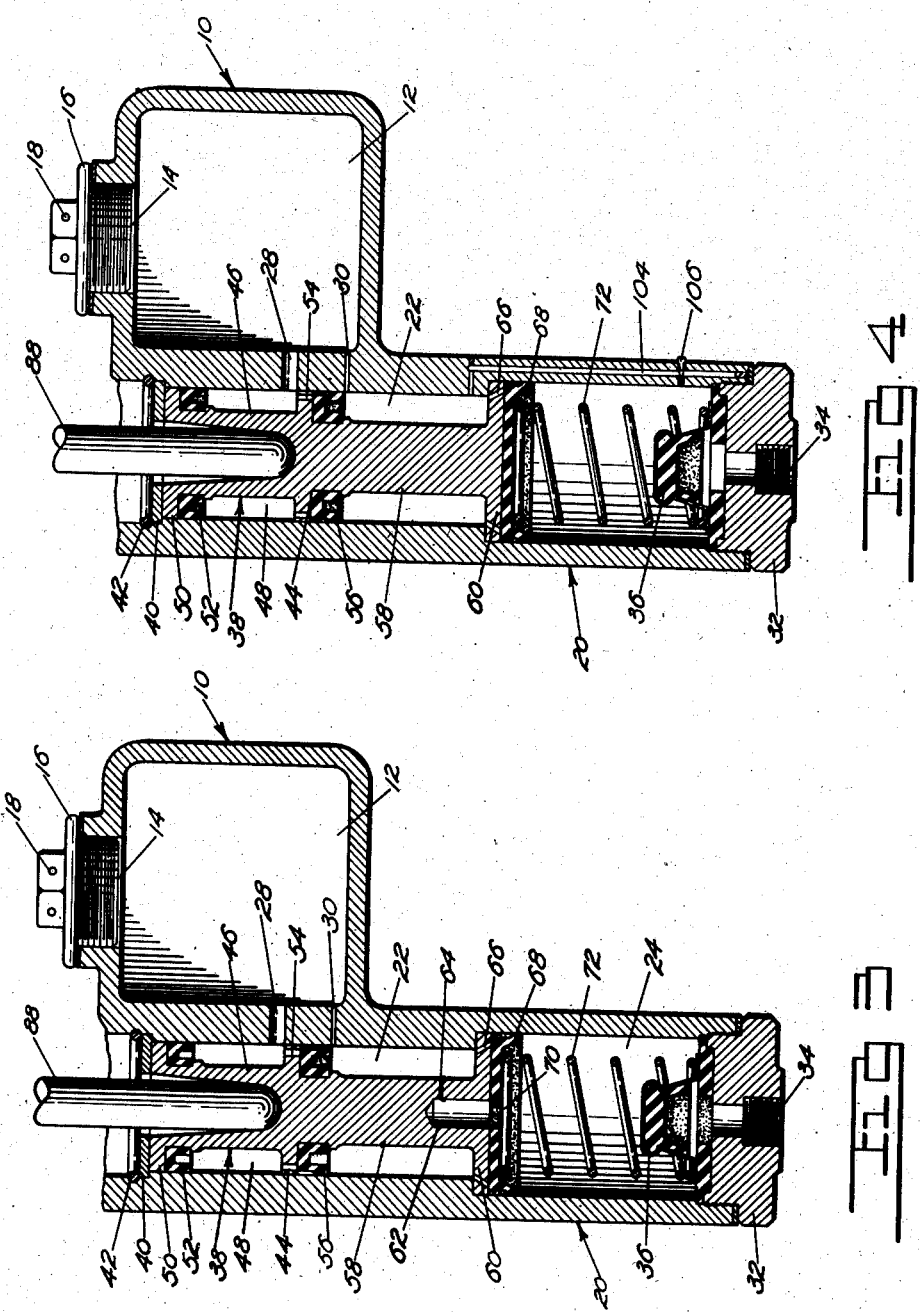

Patented Oct. 27, 1942

2,299,912

UNITED STATES PATENT OFFICE 2,299,912

COMPOUND MASTER CYLINDER

Erwin F. Loweke, Detroit, Mich., assignor to Hydraulic Brake Company, Detroit, Mich., a corporation of California Application February 7, 1940, Serial No. 317,778

9 Claims. (Cl. 60—54.6)

This invention relates to fluid pressure producing devices for applying pressure on fluid in a hydrostatic braking system to apply the brakes of the system.

In the illustrated embodiment of the invention, a fluid pressure producing device includes a reservoir and a cylinder supplied therefrom having a small chamber and a relatively large chamber forward of the small chamber, and a piston reciprocable in the cylinder provided with spaced heads complementary to the chambers. The piston head in the large chamber has a passage therethrough providing a communication between the large chamber and the small chamber. This passage is so restricted that flow of fluid from the large chamber to the small chamber during advance of the piston is so minute that an effective displacement of a large volume of fluid by the large piston as it advances on its compression stroke may be accomplished until substantial resistance to movement of the piston is had. During this movement of the piston, fluid is drawn from the reservoir past the small head of the piston into the small chamber. The quantity of fluid so received by the small chamber is greater than the quantity received from the large chamber. The combined quantities of fluid received are adequate to maintain the small chamber completely filled as the piston advances. Thereafter, as the piston advances on its compression stroke, the increased pressure on the fluid in the system results in a rapid flow of fluid from the large chamber into the small chamber until such time as the pressure on the fluid in the large and small chambers is equalized and thereafter, the large piston becomes ineffective for producing pressure.

An object of the invention is to provide a fluid pressure braking system including a fluid pressure producing device having a low pressure producing means and a high pressure producing means and means effective upon attaining a predetermined pressure in the system for transferring the pressure from the low pressure producing means to the high pressure producing means.

Another object of the invention is to provide a fluid pressure braking system including a fluid pressure producing device having a low and a high pressure producing means, and means operative to effect a transition from low to high pressure over a wide range.

Other objects and advantages of the invention will appear from the following description taken in connection with the drawings forming a part of this specification, and in which:

Fig. 1 is a schematic view of a fluid pressure braking system embodying the invention;

Fig. 2 is a vertical sectional view of the fluid pressure producing device.

Fig. 3 is a vertical sectional view of a fluid pressure producing device illustrating a modification; and Fig. 4 is a vertical sectional view of a fluid pressure producing device illustrating a further modification.

Referring to the drawings for more specific details of the invention, 10 represents generally a fluid pressure producing device including a reservoir 12, having a filling opening 14, normally closed by a plug 16 provided with an opening 18 for venting the reservoir to the atmosphere.

A cylinder 20 at the base of the reservoir has a small chamber 22 and a relatively large chamber 24 arranged forward of the small chamber and providing at its junction with the small chamber an annular shoulder 26. The small chamber has arranged in its wall spaced ports 28 and 30 providing communications between the reservoir and the chamber 22, and the outer end of the chamber 24 is closed by a head 32 provided with a discharge port 34 controlled as by a two-way valve 36.

A piston 38 reciprocable in the chamber 22 is held against displacement by a washer 40 seated on an annular shoulder in the open end of the cylinder and retained against displacement by a retaining ring 42 seated in a groove in the wall of the cylinder. The piston 38 has a head 44, a reduced body portion 46 providing in conjunction with the wall of the cylinder an annular chamber 48, and a skirt 50 supporting a sealing cup 52 for inhibiting seepage of fluid from the chamber 48 past the piston. The head 44 of the piston has spaced passages 54 therethrough providing communications between the annular chamber 48 and that portion of the chamber 22 forward of the piston 38, and a sealing cup 56 seated on the head of the piston 38 controls the passage.

An extension 58 arranged concentrically on the piston 38 supports a piston 60 for reciprocation in the large chamber 24. The extension 58 and the piston 60 are bored to provide a passage 62 communicating with the large chamber, and a restricted passage 64 provides a communication between the passage 62 and the small chamber. The piston 60 has spaced passages 66 therethrough providing communications between the small chamber and the large chamber, and a sealing cup 68 seated on the head of the piston 60 controls the passages 66. The sealing cup 68 is provided with a concentric opening 70 registering with the passage 62, and a spring 72 interposed between the sealing cup 68 and the two-way valve 36 serves to retain the cup and valve against displacement and also to return the pistons to retracted position.

A fluid pressure delivery pipe or conduit 74 suitably connected to the discharge port 34 has branches connected respectively to fluid pressure actuated motors 76 preferably arranged in pairs, one pair for actuating brakes associated with the front wheels of a vehicle, and another pair for actuating brakes associated with the rear wheels of the vehicle.

The brakes are of conventional type, each including a fixed support or backing plate 78, a rotatable drum 80 associated therewith, a pair of friction elements or shoes 82 pivoted on the backing plate for cooperation with the drum, a retractile spring 84 connecting the shoes, and a fluid pressure actuated motor corresponding to the motors 76 for actuating the shoes into engagement with the drum against the resistance of the retractile springs.

The piston 38 has in its back a socket 86 preferably extended well into the body of the piston. A thrust pin 88 has one of its ends fitted in the socket 86, and its other end pivotally connected to a coupling 90. A flexible boot 92 is attached to the coupling and connected to the open end of the cylinder for the exclusion of dust and other foreign substances, and a rod 94 attached to the coupling is pivotally connected to a foot pedal lever 96, rockably mounted on a fixed support 98 and connected by a retractile spring 100 to a fixed support 102.

A modification of the fluid pressure producing device is illustrated in Fig. 3. In this modification the structure is substantially identical to that of the preferred embodiment of the invention. The device is simply turned through an angle of ninety degrees and the fluid reservoir 12 altered by changing the location of the filling opening 14.

Another modification of the fluid pressure producing device is illustrated in Fig. 4. In this modification the structure is also substantially the same as that of the preferred embodiment of the invention. It differs only in that the passages 62 and 64 through the extension 58 and the piston head 60 of the preferred embodiment are omitted, and substituted therefor is a passage 104 through the wall of the cylinder for by-passing fluid past the piston head 60, and the passage is restricted as by a metering pin 106.

In a normal operation, upon depressing the foot pedal lever 96, force is transmitted therefrom through the rod 94 and thrust pin 88, to the pistons 38 and 60, resulting in advancing the pistons on the compression stroke. During the initial movement of the pistons 38 and 60, the sealing cup 56 on the head of the piston 38 covers the port 30, and thereafter, as the pistons advance on the compression stroke, a large volume of fluid is displaced from the chamber 24, past the two-way valve 36, through the discharge port 34, and fluid pressure delivery pipes 74, into the fluid pressure actuated motors 76, causing energization of the motors with the resultant actuation of the friction elements 82 into engagement with the drum 80 against the resistance of the retractile springs 84. Because of the displacement of a large volume of fluid, at a relatively low pressure, the friction elements are moved into engagement with the drum quite rapidly.

During this operation, a very small quantity of fluid is displaced from the chamber 22 through the opening 70 in the sealing cup 68 through the passage 62 and the restricted passage 64 into the small chamber 22. The quantity of fluid so displaced does not materially affect the rapid displacement of a large volume of fluid from the large chamber 24 into the fluid pressure actuated motors 76. Concomitantly with this operation, a partial vacuum is created in the small chamber 22 and this results in drawing fluid from the reservoir past the small piston 38 into the small chamber. The quantity of fluid so received by the small chamber is a greater quantity than the quantity received from the large chamber and the combined quantities are adequate to maintain the small chamber completely filled during advance of the piston. Upon effectively engaging the friction elements with the drums, substantial resistance is offered to movement of the friction elements, and this results in a material increase of pressure on the fluid in the system, causing rapid displacement of fluid from the chamber 24, through the opening 70 in the sealing cup 68, the passage 62, and the restricted passage 64, into the small chamber 22, so as to equalize the pressures on the fluid forward and back of the piston 60. Thereafter, the piston 60 becomes ineffective for producing pressure, and merely floats in the chamber 24.

While the flow of fluid from the chamber 24 to the chamber 22 is rapid as compared to the flow of fluid during initial actuation, it is sufficiently slow to effect a transition from low to high pressure over a wide range, so that such transition is not noticeable to the operator.

Upon completion of a braking operation, the applied force on the foot pedal lever 96 is released. This results in movement of the foot pedal to its retracted position, carrying with it the rod 94, and thrust pin 88. This results in release of the pistons, whereupon the spring 72 becomes effective to return the pistons to their retracted position. As the pistons move to their retracted position, a partial vacuum is created in the chamber 24, resulting in drawing fluid from the reservoir 12 through the port 28, into the annular chamber 48, thence through the passages 54 in the head of the piston 38 into the small chamber 22, thence through the passages 66 in the head of the piston 60, past the sealing cup 68, into the large chamber 24, completely filling the chambers.

During this operation, fluid is returning to the chamber 24 from the fluid pressure actuated motors 76 and fluid pressure delivery pipes connecting these motors to the chamber 24. This may result in the chamber 24 receiving a quantity of fluid in excess of that required to fill the chamber, and in that event fluid is displaced therefrom through the opening 70 in the sealing cup 68, the passage 62 and the restricted passage 64 into the small chamber 22, thence through the port 30 into the reservoir.

While this invention has been described in connection with certain specific embodiments, the principle involved is susceptible of numerous other applications that will readily occur to persons skilled in the art. The invention is, therefore, to be limited only as indicated by the scope of the appended claims.

I claim:

1. A fluid pressure producing device comprising a reservoir, a cylinder supplied therefrom having a small chamber and a relatively large chamber forward of and in communication with the small chamber, said large chamber having a discharge port, a piston movable in the cylinder having heads complementary to the chambers, the piston head in the large chamber having a restricted passage therethrough for flow of fluid from the large chamber to the small chamber during movement of the piston on its compression stroke, and means for drawing fluid from the reservoir into the small chamber during initial actuation of the piston, said restricted passage adapted to provide a constantly open communication between the chambers.

2. A fluid pressure producing device comprising a reservoir, a cylinder supplied therefrom including a small chamber and a large chamber arranged forward of concentric to and opening into the small chamber and having a discharge port, a piston reciprocable in the cylinder having heads complementary to the chambers, a restricted passage connecting the chambers providing a constantly open communication between the chambers, and means for drawing fluid from the reservoir into the small chamber during movement of the piston on its compression stroke.

3. A fluid pressure producing device comprising a reservoir, a cylinder supplied therefrom having a small chamber and a relatively large chamber arranged forward of and in direct communication with the small chamber and having a discharge port, a restricted passage constantly connecting the chambers, a piston reciprocable in the cylinder having heads complementary to the chambers, means for drawing fluid from the reservoir into the small chamber during movement of the piston on its compression stroke, and means for actuating the piston.

4. A fluid pressure producing device comprising a reservoir, a cylinder associated therewith having a small chamber communicating with the reservoir and a large chamber arranged forward of the small chamber and in direct communication therewith, said large chamber having a discharge port, a restricted passage constantly connecting the chambers, fluid metering means in the passage, a piston reciprocable in the cylinder having heads complementary to the chambers, sealing means for the piston heads adapted to by-pass fluid past the heads on the retraction stroke of the piston, and means for actuating the piston.

5. A fluid pressure producing device comprising a source of fluid, interconnected low and high pressure producing means supplied therefrom, a calibrated restricted passage providing constant communication between the producing means, means operative to displace a large volume of fluid from the low pressure producing means and simultaneously meter a small volume of fluid from the low pressure producing means into the high pressure producing means and to draw fluid from the source into the high pressure producing means.

6. A fluid pressure producing device comprising a source of fluid, a high pressure chamber connected thereto and communicating therewith, a low pressure chamber connected to the high pressure chamber, a constantly open communication between the high pressure chamber and the pressure producing portion of the low pressure chamber, manually actuated means operative upon initial movement to discharge a large volume of fluid from the low pressure chamber and to simultaneously meter a small volume of fluid from the low pressure chamber into the high pressure chamber and to draw fluid from said source into the high pressure chamber until the pressures on the fluid in the chambers are equalized and thereafter to increase the pressure on the fluid in the chambers without proportionately increasing the applied force to the manually actuated means.

7. A fluid pressure producing device comprising a source of fluid, a high pressure chamber communicating therewith, a low pressure chamber connected to the high pressure chamber, a continuously open communication between the pressure producing portions of the high and low pressure chambers, manually actuated means operative upon initial movement to discharge a large volume of fluid from the low pressure chamber and to simultaneously meter a small volume of fluid from the low pressure chamber into the high pressure chamber and to draw fluid from said source into the high pressure chamber until the pressures on the fluid in the chambers are equalized and thereafter to increase the pressure on the fluid in the chambers by displacement of more fluid from the large chamber.

8. A fluid pressure producing device comprising a source of fluid, a cylinder supplied therefrom including a small chamber and a large chamber having a discharge port, a calibrated restricted means providing communication between the chambers, means for creating pressure on the fluid in the chambers operative to initially displace a large volume of fluid from the large chamber into the discharge port, to meter fluid from the large chamber into the small chamber and to draw fluid from the source into the small chamber and thereafter to increase the pressure on the fluid in both chambers.

9. A fluid pressure producing device comprising a source of fluid, a cylinder associated therewith including a small chamber and a large chamber forward of concentric to and in direct communication with the small chamber and having a discharge port, a restricted passage connecting the chamber, pistons complementary to the chambers, means for actuating the pistons to displace a large volume of fluid from the large chamber into the discharge port, to meter a small volume of fluid from the large chamber into the small chamber and to draw fluid from the source into the small chamber so as to equalize the pressure on the fluid in the chambers and to thereafter effect an increase in pressure on the fluid by displacement of more fluid from the large chamber into the discharge port.

ERWIN F. LOWEKE.